(12) United States Patent  
Brazeau et al.

(10) Patent No.: US 11,176,601 B2
(45) Date of Patent: Nov. 16, 2021

(54) INTEGRATION OF INDEPENDENT DATA FOR SEARCH AND DISCOVERY

(71) Applicant: salesforce.com, inc., San Francisco, CA (US)

(72) Inventors: Jeremiah David Brazeau, Hudson, NH (US); Joselito Campos Santana, Wilmington, MA (US); Colin Brazeau, Burlington, MA (US)

(73) Assignee: salesforce.com, inc., San Francisco, CA (US)

( * ) Notice: Subject to any disclaimer, the term of this patent is extended or adjusted under 35 U.S.C. 154(b) by 105 days.

(21) Appl. No.: 16/775,929

(22) Filed: Jan. 29, 2020

(65) Prior Publication Data

US 2021/0233136 A1 Jul. 29, 2021

(51) Int. Cl.
*G06Q 30/06* (2012.01)

(52) U.S. Cl.
CPC ..... *G06Q 30/0641* (2013.01); *G06Q 30/0601* (2013.01); *G06Q 30/0623* (2013.01); *G06Q 30/0605* (2013.01); *G06Q 30/0621* (2013.01); *G06Q 30/0643* (2013.01)

(58) Field of Classification Search
None
See application file for complete search history.

(56) References Cited

U.S. PATENT DOCUMENTS

| | | | | |
|---|---|---|---|---|
| 7,197,475 | B1 * | 3/2007 | Lorenzen | G06Q 30/02 235/383 |
| 8,868,451 | B2 * | 10/2014 | Greaves | G06F 40/146 705/26.61 |
| 9,248,973 | B1 | 2/2016 | Brazeau | |
| 9,280,153 | B1 | 3/2016 | Palamarchuk | |
| 9,389,609 | B1 | 7/2016 | Mountz | |
| 9,440,790 | B2 | 9/2016 | Mountz | |
| 9,494,934 | B2 | 11/2016 | Brazeau | |
| 9,604,358 | B1 | 3/2017 | Brazeau | |
| 9,639,824 | B1 | 5/2017 | Brazeau | |
| 9,656,806 | B2 | 5/2017 | Brazeau | |
| 9,663,292 | B1 | 5/2017 | Brazeau | |
| 9,694,976 | B1 | 7/2017 | Wurman | |
| 9,758,302 | B1 | 9/2017 | Brazeau | |
| 9,767,432 | B1 | 9/2017 | Brazeau | |
| 9,923,966 | B1 | 3/2018 | Franklin | |
| 9,926,138 | B1 | 3/2018 | Brazeau | |
| 9,952,589 | B1 | 4/2018 | Brazeau | |
| 9,961,141 | B1 | 5/2018 | Allard | |
| 10,048,060 | B1 | 8/2018 | Brazeau | |

(Continued)

FOREIGN PATENT DOCUMENTS

WO WO-2015188193 A1 12/2015

OTHER PUBLICATIONS

Zisko, A., "E-commerce a boon for design-driven tabletop," HFN Home Furnishings News, 89.5: 25(2). May 2015. (Year: 2015).*

*Primary Examiner* — Nicholas D Rosen
(74) *Attorney, Agent, or Firm* — Butzel Long; Butzel/Salesforce Cynthia Seve (57) ABSTRACT

Systems and techniques are provided for enhanced and flexible ingestion of product-related data from various and diverse data sources. The product-related data is linked to interactions that allow end-user customers to view and manipulate product listings and product data using the ingested information.

16 Claims, 5 Drawing Sheets

(56) References Cited

U.S. PATENT DOCUMENTS

| | | | |
|---|---|---|---|
| 10,077,155 B1 | 9/2018 | Mountz | |
| 10,144,591 B2 | 12/2018 | Brazeau | |
| 10,192,195 B1 | 1/2019 | Brazeau | |
| 10,209,711 B1 | 2/2019 | Brazeau | |
| 10,223,666 B1 | 3/2019 | Palamarchuk | |
| 10,315,231 B1 | 6/2019 | Brazeau | |
| 10,322,802 B1 | 6/2019 | Krishnaswamy | |
| 10,330,480 B1 | 6/2019 | Krishnaswamy | |
| 10,364,099 B1 | 7/2019 | Brazeau | |
| 10,379,959 B1 | 8/2019 | Franklin | |
| 10,399,772 B1 | 9/2019 | Brazeau | |
| 10,450,138 B1 | 10/2019 | Pikler | |
| 10,528,061 B2 | 1/2020 | Brazeau | |
| 2002/0007322 A1* | 1/2002 | Stromberg | G06Q 30/06 705/26.1 |
| 2007/0106938 A1* | 5/2007 | Greaves | G06F 40/186 715/700 |
| 2018/0082244 A1* | 3/2018 | Brazeau | G06T 7/73 |
| 2018/0285808 A1* | 10/2018 | Swiercz | G06Q 10/087 |

* cited by examiner

INTEGRATION OF INDEPENDENT DATA FOR SEARCH AND DISCOVERY

BACKGROUND

Commerce platforms often include backend systems on which a user may build a commercial site, such as a website that sells products or services. The commerce platform typically manages interactions with other systems, product and customer data storage, payment processing, and other functionality that is common across many sites, thereby providing a platform that may be used and customized by each user for their own products and services. Such commerce platforms may provide various techniques for each user to define the data that will populate the user's site. For example, the platform may provide a mechanism for a user to provide product information for products the user intends to offer for sale via their site on the commerce platform. The provided data then may be included in a search index or otherwise made available to the user's customers when they access the site.

DETAILED DESCRIPTION

As used herein, a "user" may refer to a merchant, which may be a corporation or other organization, an individual, or any other entity that provides goods and/or services to its customers. A merchant may be a customer of another entity, such as a provider of a computerized commerce platform or similar framework that the merchant customizes to fits its particular business, and may sell goods and services to other businesses, individuals, or, more generally, any entity. For example, a computerized commerce platform may provide a framework that allows its customers to develop and deploy commercial websites, such as for the sales of goods and/or services to their own customers. The platform may allow users to update inventory, prices, and the like; to offer various promotions to its own customers; to connect the user's commercial site to other data sources and/or to export data to other systems; to manage resources such as images, videos, text, and the like; and, more generally, to manage the presentation and operation of the commercial site and its interaction with the user's customers. A computerized commerce platform typically will be implemented on one or more servers and may be provided as a cloud-based service, as will be readily understood by one of skill in the art.

Typically, a conventional computerized commerce platform as disclosed may provide a technique for a user of the platform to provide basic product information The user also generally may define basic types of data within the product information, such as price, description, category, descriptive tags, and the like. Commerce platforms typically allow a user to provide product data of various types and, for each type of product data, indicate how the data should be displayed to customers on the user's site. Conventional commerce platforms generally provide pre-set interactions that customers may use to manipulate the product data, such as searching any text available, but generally they do not allow users to define one or more interactions for the data type that enable customers accessing the user's site to interact with the data in a particular way envisioned by the user.

Embodiments disclosed herein provide methods and systems that allow for users to specify how customers should be able to interact with product data, and for arbitrary data to be incorporated into commerce sites, and for this and other data to be automatically processed to provide customers with enhanced features and data. For example, the user may specify that the customers should be able to search product descriptions, filter by product type, and sort by product price. The platform may implement the functionality selected or defined by the user on the user's site. In this example, the user's customers would then be able to search the data provided by the user as product descriptions, such as to find a particular product or a product having a description that contains a text string input by the customer. The actual search functionality may be implemented by the platform itself, so that the user only needs to indicate which data fields should be searchable and then rely on the platform to implement appropriate text analysis, indexing, search optimization, and the like. Similarly, continuing the same example, a customer of the user is able to sort lists of products by the price of each product, and is able to filter lists of products based on the category assigned to each product.

Figure 1:
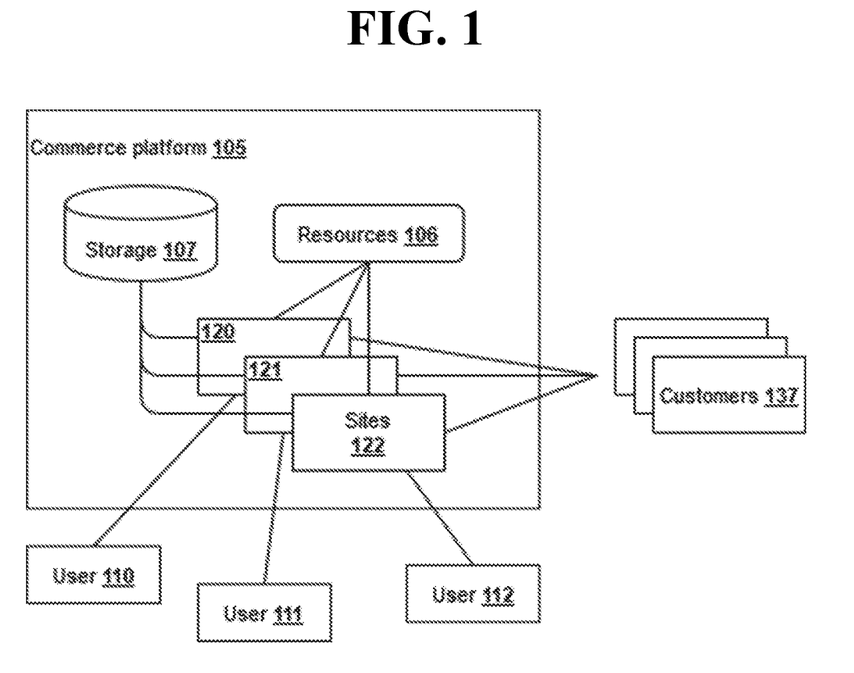
FIG. 1 shows a computerized commerce platform according to an embodiment of the disclosed subject matter.

FIG. 1 shows an example arrangement according to embodiments disclosed herein. A computerized commerce platform 105 may provide a commerce platform to multiple users 110, 111, 112, etc., each of which may maintain one or more sites 120, 121, 122, respectively, on the platform. The sites may use common resources such as computing resources 106 such as memory and processing capability, data storage 107, and the like, but generally the platform 105 will include controls that prevent one user 110 from accessing the data of another user 111, 112 directly or indirectly. End-user customers 137 of the users 110, 111, 112 may access the sites 120, 121, 122 to purchase goods and/or services from the users 110, 111, 112. The users 110, 111, 112 may define the goods and/or services offered, set pricing, features, and the like, offer promotions, and otherwise control their own sites on the platform 105 as previously disclosed. In conventional systems, each of the sites 120, 121, 122 may be run, managed, and accessed separately from the others. That is, there may not be an overall commerce platform 105 that hosts and manages various functional aspects of the user sites. In other conventional systems, although a common host may exist to store the data associated with the sites 120-122 and provide access to customers 137, such as a website hosting service, typically such a platform does not provide any mechanism for one user and site 110/120 to benefit from any activities of another user and site 111/121. In contrast, embodiments disclosed herein may allow for one or more users 110-112 to benefit from promotions and other activities previously used by one or more other users 110-112, while still preventing any user from accessing data of another or otherwise obtaining technical or business data about the other users' sites.

Figure 2A:
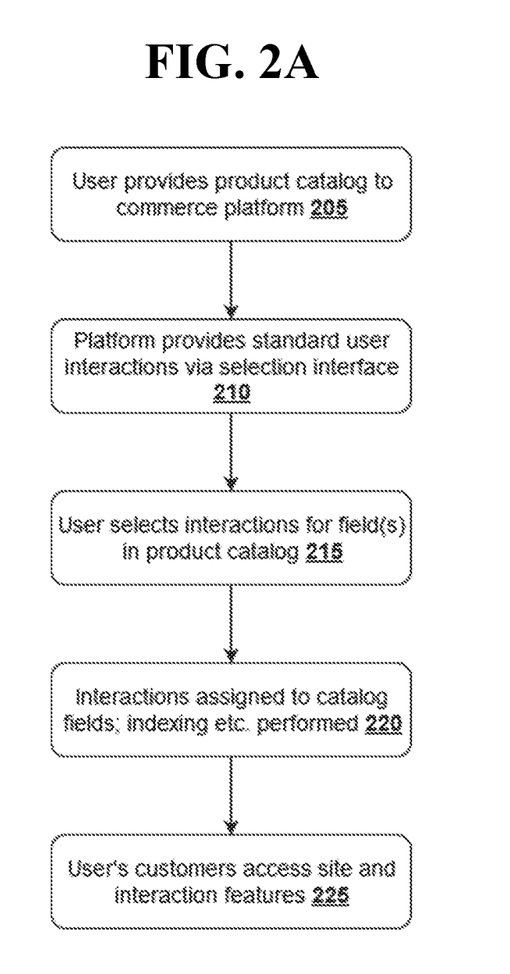
FIGS. 2A and 2B show an example process for obtaining product information and generating interactions for use in a user interface according to embodiments disclosed herein.
Figure 2B:
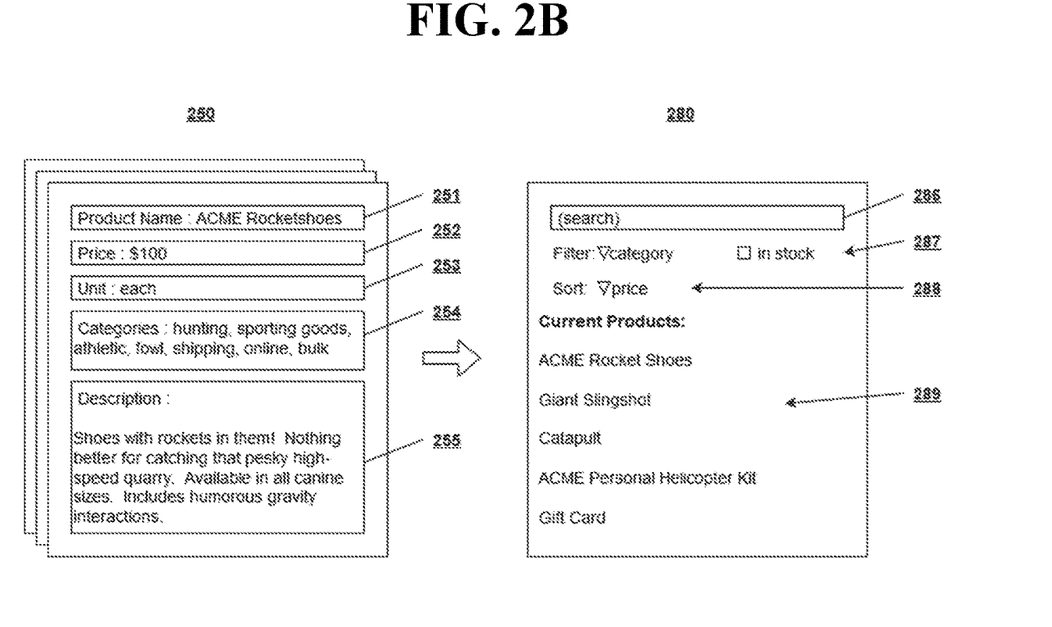

As previously disclosed, embodiments of the present subject matter may provide techniques to obtain, process, and manipulate data for a user 110-112 to use on their site 120-122 in order to provide enhanced features on the user's site 120-122. FIGS. 2A and 2B show a search technique for a user of a computerized commerce platform to provide product data to be ingested by the platform according to embodiments disclosed herein. The process shown in FIG. 2A may begin when a user provides a product catalog or similar compilation of product data to the commerce platform at 205. The product data may be provided in any suitable form, such as XML, JSON, text entered in bulk or via a form, an API to a system controlled by the user, or the like. Generally, the product data will include one or more fields populated with data about the products. For example, the product data may include a name, identifier (such as a unique ID), pricing data, descriptive data such as tags, categories, text description, and the like, color or color options, sizing, and the like. The specific data provided may depend upon the type of product, the user providing the product, the industry for which the product is intended, the data available to the user, and the like.

At 210, a computerized commerce platform as disclosed herein may provide one or more standard interactions available on the platform for user-provided product data. Such interactions may include filtering, searching, ordering, product bundling, and the like. More generally, an interaction in this context refers to a technique and interface for viewing and/or manipulating product data that the commerce platform makes available to customers that access a user's site via the platform. For example, the commerce platform may provide a technique and interface for users to identify multiple products as being available for grouping in a bundle, such as to offer discounts or other incentives, or to offer additional products to customers that are viewing, purchasing, or have previously viewed or purchased one of the bundled products. As another example, the platform may provide a technique and interface for the user to indicate that the data in a field of the product catalog can be used by the user's customers to filter product listings, such as a list of products resulting from a customer search or other query. Any other technique for viewing or interacting with product data on the user's site may be included as a built-in product interaction offered by the computerized commerce platform. Alternatively or in addition, the platform may provide a technique and interface for the user to define their own interactions. Pre-defined and user-defined interactions may be provided at 210 for the user to select and define for the product data in the product catalog at 215, typically by assigning one or more interactions to one or more data fields in the product data.

At 220, the interactions may be assigned to the product data so that appropriate interfaces and options may be provided to customers when accessing the user's site. The links between product data fields and interactions may be stored in the commerce platform storage 105 on a user-by-user basis as previously disclosed.

At 225, one or more customers access the user's site on the commerce platform and may use the interactions selected at 210/215 to view and manipulate product data on the user's site. For example, the user may perform a text search via a standardized text interface provided by the commerce platform, at which point the platform may execute a search of those fields the user identified as searchable at 210/215.

FIG. 2B shows an example product catalog 250 and associated schematic customer interface 280 resulting from a user of a commerce platform as disclosed herein assigning interactions to product data. The example product catalog 250 includes multiple fields: product name 251, product price information 252, 253, product categories 254, and description 255. The fields shown in the example are illustrative and non-limiting, and many other fields and types of fields may be used.

The customer interface 280 provides various interactions that may be used to view and manipulate the data provided by the user from the product catalog 250. In this example, the product list 289 may be manipulated through a search interface 286, filters 287, and a sort option 288. In the example the user selected category 254 as a filterable field, price data 252, 253 as a sortable field, and product name 251 and description 255 as searchable fields. The commerce platform also provides a built-in filter 287 to show only products that are in stock. The platform may be able to offer such a feature even absent a user selection where, for example, the platform has access to the user's inventory data such as via an API or other connection to user product data. In some cases, the platform may automatically manipulate data provided by the user to meet the interactions selected by the user. Continuing the example in FIG. 2B, the platform may automatically determine an appropriate "total price" for the sort interaction based upon the per-unit price 252 and the price unit 253. In general, any known interaction may be provided for users to select for application to data fields in product data provided by the user.

However, an arrangement as shown in FIGS. 2A-2B may require a relatively high degree of user involvement and effort if it was extended to arbitrary data sources, such as independent data sources not controlled by the user who provides them, since the computerized commerce platform typically cannot automatically determine an interaction mode for an arbitrary product data type. For example, it may be relatively easy for a computerized commerce platform to be programmed to automatically identify price data and automatically make the price a sortable data type. However, more complicated data types that may be suitable for multiple types of user interactions (search, sort, filter, bundle, etc.) may be much more difficult or impossible to automatically assign to an interaction without further user effort. Furthermore, conventional computerized commerce platforms generally are not able to use data sources other than those explicitly provided by the user and/or directly connected to the initial product data, and typically cannot automatically link related types of data to provide enhanced product data, identify related products, bundle related products together, or the like. Thus, such automation may not be available outside of embodiments disclosed herein.

Figure 3:
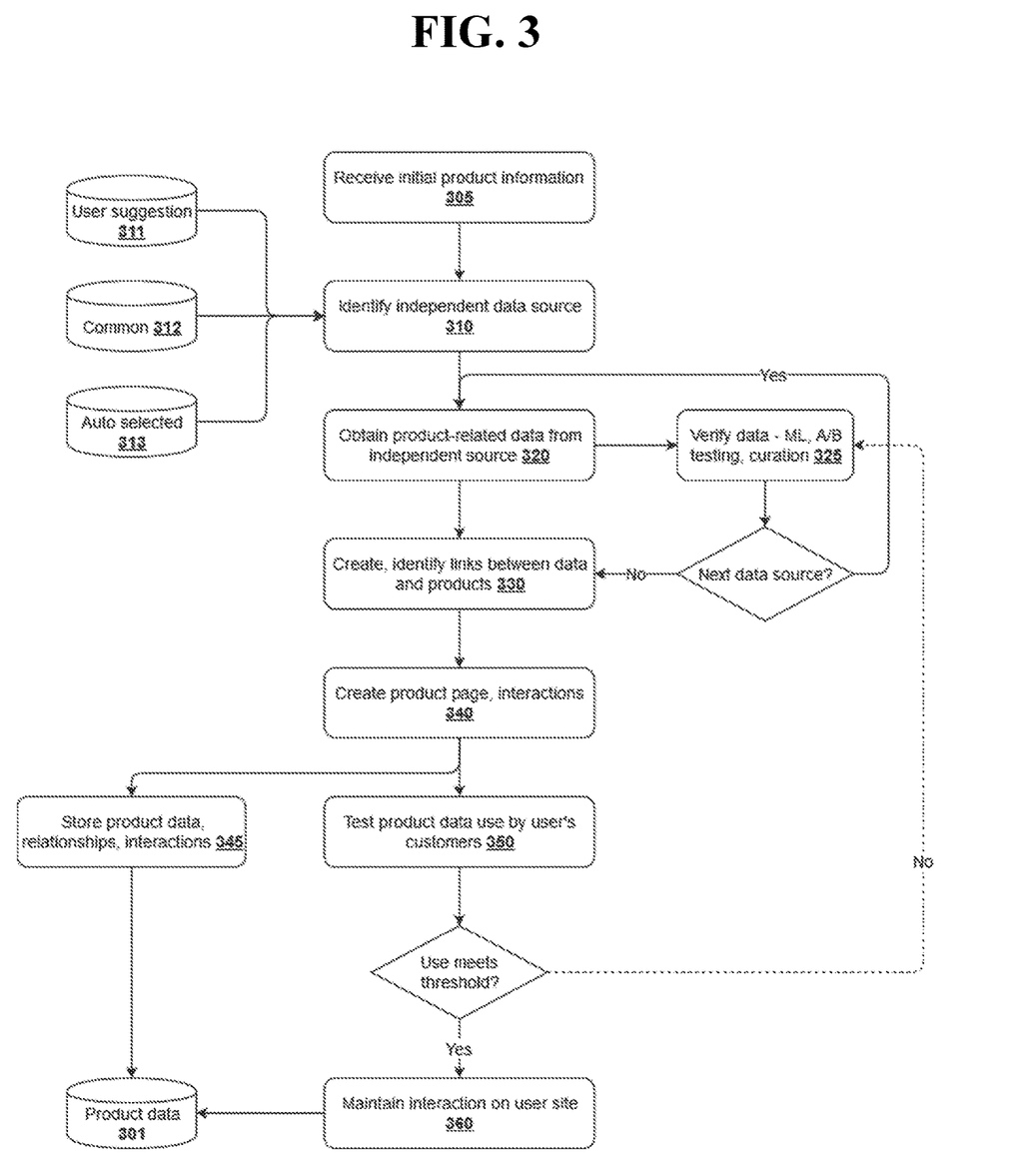
FIG. 3 shows an example for obtaining and ingesting product data from an independent data source.

FIG. 3 shows an example process that allows for ingestion of arbitrary product-related data using data sources other than a product catalog explicitly provided by a user. At 305, initial product information may be received by the commerce platform from the user. The product information may be received via a product catalog or other technique or source as previously disclosed. Similarly, as previously disclosed, the user may assign various interactions for the product data provided by the user. At 310, an independent data source may be identified. As used herein, an "independent" data source refers to one that is not immediately and exclusively under control of the user, in contrast to a product catalog as previously disclosed. In some cases an independent data source may include data that originates from the user although the source may not be controlled, maintained, curated, or otherwise managed by the user. For example, a compilation data source may include data for the user's products as well as various other products, some of which data may be used to augment the user's products such as for presenting comparisons to the user's customers. Independent data sources may include sources suggested or provided by the user 311, such as where a user provides a link to an online data store that the platform may access to obtain product data and product-related data. As another example, the commerce platform may access common data sources 312 that provide information about a variety of products, some of which may not be products offered by the user. A common data source may be provided by the user, by another user, or may be known already to the commerce platform without requiring any user to identify it explicitly. As another example, automatically-selected data sources 313 may be used. For example, the commerce platform may access standardized or regulatory information upon identifying a product or type of product provided by the user. The example types of data sources 311, 312, 313 are illustrative and, more generally, any data source to which the commerce platform has or may be given access may be used as an independent data source as disclosed herein.

As a specific example, a user may provide information about various cleaning products to be sold on the user's site. The user may provide a user-suggested independent data source 311 that includes environmental information about the cleaning products as evaluated by an unrelated third party, such as a review site, standards testing entity, or the like. After identifying the cleaning products as including some liquid products, either automatically based on context information (product descriptions, keywords, and the like) or based on an explicit indication from a user, the commerce platform may automatically obtain shipping rules and rates for liquid purchases from a common data source 312, such as shipping information provided by the USPS. The commerce platform also may automatically determine that the cleaning products include various materials for which safety information may be available, such as by text analysis of the product data provided by the user. The platform then may automatically select a data source 313 that includes material safety data sheets for the appropriate materials. In some cases, the independent data source may be available via a channel linked to the user's site on the commerce platform. For example, a user may link their site to a pharmacy app that provides information on each customer's prescriptions. In this case, product data such as warning label information, use cases, scholarly or industry-published articles, known drug interactions, and the like may be obtained through the pharmacy app and ingested as product-related data. The data also may be seasonal or otherwise linked to products in time, such as where allergy medication is often prescribed and used during particular times of the year. The platform may identify that allergy medications are often purchased at a particular time of year and obtain or provide related information during that time, while suppressing it or excluding it at other times of the year. As another example, an independent data source may be other data that is stored in the commerce platform but is not specific to the individual user, such as where common industry information is stored by the platform and known to apply to a user's site. As a specific example, the platform may have extensive information stored about popular retail trends, such as seasonal clothing, purchasing trends linked to current events, most popular brands, and the like. This information may be used as an independent data source. Typically where such information is used it will be "scrubbed" to remove any possible link to any other individual user of the platform, so that one user is not able to use the independent data source to obtain information about another user's site such as customer data, sales data, entity information for the other user, and the like. As another example, the platform may provide an interface for users to submit independent data sources for inclusion or consideration in the data sources available for each user's site or for all user sites on the platform. Such a repository of independent data sources may be maintained on a user-by-user basis such that each user only accesses their own repository, or a single repository may be used by the platform so that all user sites can access all sites in the repository. In some cases, the platform may provide a mechanism for users to "opt in" to joining such a repository, where each user obtains the benefit of data sources in the repository if they also allow other user sites to use the data sources they provide. Typically the platform will still enforce user separation controls, so that no user can directly access or even identify data sources provided by other users even where the platform uses all data sources in the repository as candidates to enrich each user's site on the platform. That is, while the commerce platform may have access to the data sources identified by multiple users to obtain data to be used on each of those user's sites, the users themselves may not be given access to the data sources directly.

At 320, the commerce platform may automatically obtain product-related data from one or more independent data sources identified at 310. The data may be accessed via any known technique and in any known format, though generally the platform will have multiple pre-defined data formats that it can readily ingest.

In some cases, at 325 the platform may be configured to verify the product-related data obtained at 320, such as to make sure that it is of interest to customers, that it is in fact related to the products in the user's site, or to verify other aspects of the obtained data. For example, data may be presented to customers and evaluated using A/B testing or similar techniques; it may be processed via machine learning (ML) techniques to determine if it is within a threshold similarity measure to the identified products; it may be presented to the user for review and/or further curation; the platform may execute one or more text comparisons of the obtained data to other known-accurate product data; or the like. As a specific example, data obtained from the independent data source may be linked to specific products and customer behavior may be observed to determine if the link between the product and the data is a strong one. Initially each link may be presumed to be relatively weak, with the strength increasing each time that a customer of the user clicks on or otherwise accesses the data when viewing the linked product. Over time, only those links that achieve a strength over the threshold may be retained. Other customer behavior also may be used to determine whether product data is appropriate to use, such as the length of time the customer interacts with a page or a piece of data, mouse movement and hover data, and the like. In any case, such data typically will be anonymized so that no link to any individual customer is retained in the commerce platform, and no personally-identifiable information is obtained or stored by the platform. As another specific example, a knowledge graph may be constructed for data obtained from independent data sources and/or data from product catalogs provided by the user. The commerce platform may traverse such a graph to determine appropriate data to include in the user's site.

If the data passes a verification threshold associated with the verification technique, it may be included on the user's site on the platform. Otherwise, it may be further evaluated, used only in limited situations in which it was found valid, or it may be discarded. If multiple data sources have been identified at 310, the process may loop to 320 to process the next data source.

At 330, the platform may create links between the product data obtained from the independent data source and the products provided by the user. Continuing the previous example, the platform may link material safety data for individual materials to each product that contains the material according to the product data provided by the user or otherwise obtained for each product. As another example, the product data provided by the user may not include every material component, but the platform may have obtained component lists from another independent data source based on, for example, trade or brand names for the materials provided by the user, thereby allowing the platform to link the safety data to the appropriate products.

At 340, interactions may be created for the user's products and/or product pages on the user's site on the commerce platform using the data obtained from the independent data source(s). Each interaction may be associated with a customer user interface component, such as the examples shown in FIG. 2B. The interactions may be created as previously disclosed, such as by allowing the user to select one or more interactions for fields in data obtained from the independent data source. Alternatively or in addition, the commerce platform may automatically create appropriate interactions. For example, fields found to contain a significant amount of searchable text may be included in search indexing so that it is available for searches run by the user's customers. As another example, the commerce platform may determine that data obtained from the product catalog or an independent data source should be considered for bundling with one or more products. This may occur, for example, where the product data itself may be something that customers may want or expect to receive with an associated product. As a specific example, a user site may sell pharmaceuticals and the commerce platform may obtain dosage, safety, disclosure, and other information from an independent data source as previously disclosed. The platform may create product bundles that include the pharmaceutical and a digital copy of the appropriate data to be provided to the customer as a downloadable product.

To automatically create a customer interaction, the commerce platform may automatically identify similar product data and similar interactions that are already present on the platform, and then create similar interactions for the matching data obtained from a data source. For example, the platform may automatically create a text search interaction that uses fields having a large amount of text that more closely resembles descriptive product text rather than, e.g., internal identifiers and attributes. As another example, buying histories of one or more customers across one or more user sites may be used to automatically create product bundles where the same types of products are observed to have been purchased together.

Once the product data interactions have been created, they may be implemented on the user's site on the commerce platform by creating appropriate user interfaces, product pages, and the like at 340. For example, where the platform has identified a field of data from an independent data source as being suitable for filtering (e.g., it has a limited number of options across all products), an option to filter by data in that field may be created and added to the appropriate product pages on the user's site. The product data, interactions, and relationships such as "related product" data, product bundles, and the like may be stored in the user's product data 301 at 345.

The commerce platform also may further test the use of the interactions, such as by implementing A/B testing, tracking the use or non-use of each interaction, and the like. This may be useful to prevent excessive user interfaces from being added to the user's site, especially in cases where a particular interface and interaction is not used very often, or appears to give unsatisfactory results to the user's customers. Generally an acceptable threshold may be defined for each interaction generated for the user's site, such as based on the percentage of customers that use the interaction, the number of orders or products views submitted after using the interaction, or the like. If the interaction meets the threshold, it may be maintained on the user's site at 360. The interaction and data related to customer use of the interaction also may be stored with the product data 301 or elsewhere by the commerce platform for future use.

Figure 4:
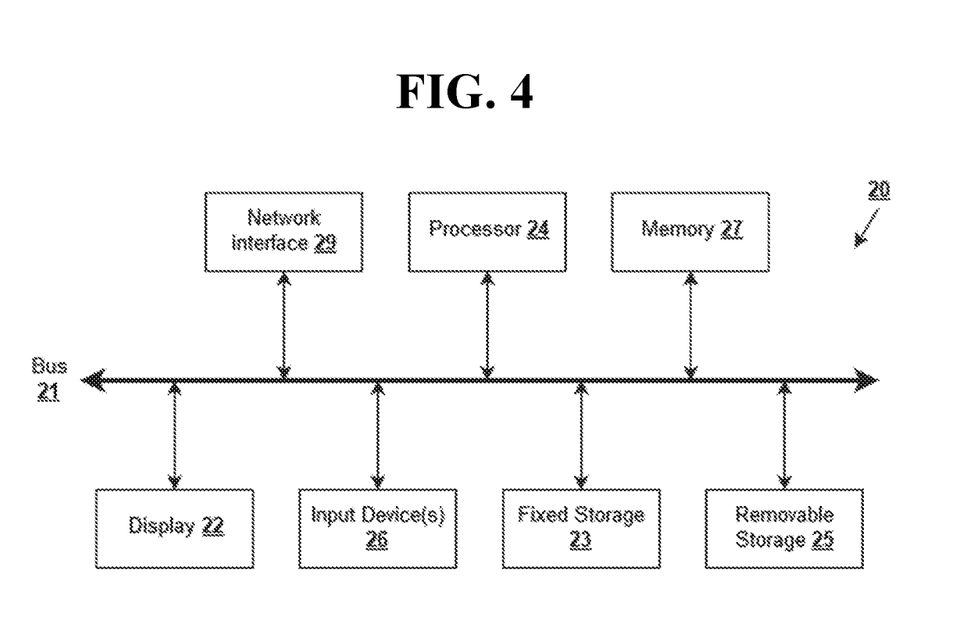
FIG. 4 shows an example computer architecture suitable for implementing embodiments disclosed herein.

Embodiments disclosed herein may be implemented in and used with a variety of component and network architectures. FIG. 4 is an example computing device 20 suitable for implementing aspects of the presently disclosed subject matter as previously disclosed, including but not limited to a personal computing device that may be used by a user or a customer to access sites on a computerized commerce platform, a server or cloud computing component suitable for hosting and/or implementing the commerce platform, or the like. The device 20 may be, for example, a desktop or laptop computer, a mobile computing device such as a phone or tablet, or the like, a headless or other server architecture, or the like.

The device 20 may include a bus 21 which interconnects major components of the computer 20, such as a central processor 24, a memory 27 such as Random Access Memory (RAM) or the like, a user display or other output device 22 such as a display screen, one or more user input devices 26, which may include one or more controllers and associated user input devices such as a keyboard, mouse, touch screen, and the like, a fixed storage 23 such as a hard drive, flash storage, and the like, a removable storage unit 25 operative to control and receive an optical disk, flash drive, and the like, and a network interface 29 operable to communicate with one or more remote devices via a suitable network connection.

The bus 21 allows data communication between the central processor 24 and one or more memory components. Applications resident with the computer 20 are generally stored on and accessed via a computer readable medium, such as a fixed storage 23 and/or a removable storage 25 such as an optical drive, floppy disk, or other storage medium.

The fixed storage 23 may be integral with the computer 20 or may be separate and accessed through other interfaces. The network interface 29 may provide a direct connection to a remote server via a wired or wireless connection. The network interface 29 may provide such connection using any suitable technique and protocol as will be readily understood by one of skill in the art, including digital cellular telephone, Wi-Fi, Bluetooth®, near-field, and the like. For example, the network interface 29 may allow the computer to communicate with other computers via one or more local, wide-area, or other communication networks. Other components may be included and some described components may be omitted without departing from the scope or content of the disclosed embodiments. For example, in embodiments in which the disclosed systems and methods are embodied in a postage meter, the meter may include one or more ascending and/or descending registers as is understood in the art.

More generally, various embodiments of the presently disclosed subject matter may include or be embodied in the form of computer-implemented processes and apparatuses for practicing those processes. Embodiments also may be embodied in the form of a computer program product having computer program code containing instructions embodied in non-transitory and/or tangible media, such as floppy diskettes, CD-ROMs, hard drives, USB (universal serial bus) drives, or any other machine readable storage medium, such that when the computer program code is loaded into and executed by a computer, the computer becomes an apparatus for practicing embodiments of the disclosed subject matter. Embodiments also may be embodied in the form of computer program code, for example, whether stored in a storage medium, loaded into and/or executed by a computer, or transmitted over some transmission medium, such as over electrical wiring or cabling, through fiber optics, or via electromagnetic radiation, such that when the computer program code is loaded into and executed by a computer, the computer becomes an apparatus for practicing embodiments of the disclosed subject matter. When implemented on a general-purpose microprocessor, the computer program code segments configure the microprocessor to create specific logic circuits.

In some configurations, a set of computer-readable instructions stored on a computer-readable storage medium may be implemented by a general-purpose processor, which may transform the general-purpose processor or a device containing the general-purpose processor into a special-purpose device configured to implement or carry out the instructions. Embodiments may be implemented using hardware that may include a processor, such as a general-purpose microprocessor and/or an Application Specific Integrated Circuit (ASIC) that embodies all or part of the techniques according to embodiments of the disclosed subject matter in hardware and/or firmware. The processor may be coupled to memory, such as RAM, ROM, flash memory, a hard disk or any other device capable of storing electronic information. The memory may store instructions adapted to be executed by the processor to perform the techniques according to embodiments of the disclosed subject matter.

The foregoing description, for purpose of explanation, has been described with reference to specific embodiments. However, the illustrative discussions above are not intended to be exhaustive or to limit embodiments of the disclosed subject matter to the precise forms disclosed. Many modifications and variations are possible in view of the above teachings. The embodiments were chosen and described in order to explain the principles of embodiments of the disclosed subject matter and their practical applications, to thereby enable others skilled in the art to utilize those embodiments as well as various embodiments with various modifications as may be suited to the particular use contemplated.

The invention claimed is:

1. A method comprising:
   receiving, by a computerized commerce platform, from a first user having a commerce site on the computerized commerce platform, initial product data for a plurality of products offered on the commerce site of the first user;
   identifying an independent data source from which to obtain additional product data for the plurality of products;
   obtaining product-related data from the independent data source, the product-related data being different than the initial product data and describing attributes of the plurality of products;
   for a first data field in the product-related data obtained from the independent data source, automatically creating a first interaction that allows a second user accessing the site of the first user on the commerce platform to view or manipulate the product-related data on the site of the first user;
   generating a page on the site of the first user that includes the interaction;
   receiving an input from the second user using the first interaction; and
   presenting the product-related data as defined by the first interaction.

2. The method of claim 1, wherein the identifying the independent data source comprises receiving an indication of the independent data source from the first user.

3. The method of claim 1, wherein the identifying the independent data source comprises automatically identifying the independent data source based on the initial product information.

4. The method of claim 1, further comprising verifying the relevance of the product-related data to the products described in the initial product data received from the first user.

5. The method of claim 1, further comprising testing use of the interaction by a plurality of customers of the first user.

6. The method of claim 1, further comprising automatically generating, based on the first interaction, a second interaction for second product-related data obtained from an independent data source for products described in product data provided by a third user, wherein the third user has a commerce site on the commerce platform that is not the site of the first user.

7. The method of claim 1, further comprising receiving an identification of the independent data source from a third user prior to identifying the independent data source.

8. The method of claim 1, wherein the independent data source comprises data for a plurality of products offered on the site of the first user and a plurality of products not offered on the site of the first user.

9. A system comprising:
   a computer-readable storage storing product data and interactions that allow users accessing a computerized commerce platform to view and/or manipulate the product data;
   a processor; and
   a memory storing instructions that cause the processor to:
      receive, from a first user having a commerce site on the computerized commerce platform, initial product data for a plurality of products offered on the commerce site of the first user;
      store the initial product data in the computer-readable storage;
      identify an independent data source from which to obtain additional product data for the plurality of products;
      obtain product-related data from the independent data source, the product-related data being different than the initial product data and describing attributes of the plurality of products;
      for a first data field in the product-related data obtained from the independent data source, automatically create a first interaction that allows a second user accessing the site of the first user on the commerce platform to view or manipulate the product-related data on the site of the first user;
      generate a page on the site of the first user that includes the interaction;
      receive an input from the second user using the first interaction; and present the product-related data as defined by the first interaction.

10. The system of claim 9, wherein the identifying the independent data source comprises receiving an indication of the independent data source from the first user.

11. The system of claim 9, wherein the identifying the independent data source comprises automatically identifying the independent data source based on the initial product information.

12. The system of claim 9, the instructions further causing the processor to verify the relevance of the product-related data to the products described in the initial product data received from the first user.

13. The system of claim 9, the instructions further causing the processor to verify test use of the interaction by a plurality of customers of the first user.

14. The system of claim 9, the instructions further causing the processor to automatically generate, based on the first interaction, a second interaction for second product-related data obtained from an independent data source for products described in product data provided by a third user, wherein the third user has a commerce site on the commerce platform that is not the site of the first user.

15. The system of claim 9, the instructions further causing the processor to receive an identification of the independent data source from a third user prior to identifying the independent data source.

16. The system of claim 9, wherein the independent data source comprises data for a plurality of products offered on the site of the first user and a plurality of products not offered on the site of the first user.

* * * * *